United States Patent
Aiso et al.

(10) Patent No.: US 10,910,632 B2
(45) Date of Patent: Feb. 2, 2021

(54) NEGATIVE ELECTRODE FOR ELECTRIC DEVICE AND ELECTRIC DEVICE USING THE SAME

(71) Applicant: Nissan Motor Co., Ltd., Yokohama (JP)

(72) Inventors: Yuka Aiso, Kanagawa (JP); Atsushi Itou, Kanagawa (JP); Manabu Watanabe, Kanagawa (JP); Naoki Ueda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/461,986

(22) PCT Filed: Nov. 22, 2016

(86) PCT No.: PCT/JP2016/084632
§ 371 (c)(1),
(2) Date: May 17, 2019

(87) PCT Pub. No.: WO2018/096593
PCT Pub. Date: May 31, 2018

(65) Prior Publication Data
US 2019/0326585 A1    Oct. 24, 2019

(51) Int. Cl.
*H01M 4/133* (2010.01)
*H01M 4/131* (2010.01)
(Continued)

(52) U.S. Cl.
CPC .......... *H01M 4/133* (2013.01); *H01M 4/131* (2013.01); *H01M 4/134* (2013.01); *H01M 4/386* (2013.01);
(Continued)

(58) Field of Classification Search
CPC ...... H01M 4/133; H01M 4/387; H01M 4/386; H01M 4/134; H01M 4/131;
(Continued)

(56) References Cited

U.S. PATENT DOCUMENTS

| 6,114,065 | A | 9/2000 | Inoue et al. | |
| 6,558,841 | B1 * | 5/2003 | Nakagiri | ............... H01M 4/134 429/218.1 |

(Continued)

FOREIGN PATENT DOCUMENTS

| CN | 101110473 A | 1/2008 |
| CN | 101252180 A | 8/2008 |

(Continued)

OTHER PUBLICATIONS

English machine translation of Noguchi JP2005-235628 (Year: 2005).*

(Continued)

*Primary Examiner* — Lisa S Park
(74) *Attorney, Agent, or Firm* — Young Basile Hanlon & MacFarlane, P.C.

(57) ABSTRACT

A negative electrode for an electric device includes a silicon-containing alloy containing silicon and tin, a carbon cover layer including a carbon material and covering the silicon-containing alloy, and a negative electrode electric conducting additive. A ratio of an average particle diameter of the silicon-containing alloy to an average particle diameter of the carbon material is 240 or greater. The negative electrode for an electric device and an electric device using the negative electrode can improve cycle durability.

19 Claims, 2 Drawing Sheets

(51) Int. Cl.
  *H01M 4/134* (2010.01)
  *H01M 4/38* (2006.01)
  *H01M 4/02* (2006.01)
(52) U.S. Cl.
  CPC ...... *H01M 4/387* (2013.01); *H01M 2004/027* (2013.01)
(58) Field of Classification Search
  CPC ....... H01M 2004/027; H01M 10/0525; H01M 4/625; H01M 4/525; H01M 4/505
  See application file for complete search history.

(56) References Cited

U.S. PATENT DOCUMENTS

| | | | | |
|---|---|---|---|---|
| 2006/0204855 | A1* | 9/2006 | Saruwatari | H01B 1/122 |
| | | | | 429/324 |
| 2010/0140554 | A1* | 6/2010 | Oki | H01M 4/131 |
| | | | | 252/500 |
| 2012/0052386 | A1* | 3/2012 | Ookita | H01M 4/13 |
| | | | | 429/215 |
| 2012/0052388 | A1* | 3/2012 | Jung | H01M 4/364 |
| | | | | 429/218.1 |
| 2014/0110634 | A1* | 4/2014 | Cho | H01M 4/587 |
| | | | | 252/502 |
| 2015/0118555 | A1 | 4/2015 | Akikusa et al. | |
| 2015/0132655 | A1* | 5/2015 | Yuge | H01M 4/362 |
| | | | | 429/232 |
| 2015/0333318 | A1* | 11/2015 | Huang | H01M 4/134 |
| | | | | 429/338 |
| 2016/0049643 | A1 | 2/2016 | Kim et al. | |
| 2016/0141607 | A1* | 5/2016 | Park | H01M 4/366 |
| | | | | 429/213 |
| 2017/0324089 | A9 | 11/2017 | Sawai et al. | |
| 2018/0123124 | A1* | 5/2018 | Yang | H01M 4/625 |

FOREIGN PATENT DOCUMENTS

| | | |
|---|---|---|
| CN | 104979536 A | 10/2015 |
| JP | H10312811 A | 11/1998 |
| JP | 2004311429 A | 11/2004 |
| JP | 2010118330 A | 5/2010 |
| JP | 2013122883 A | 6/2013 |
| JP | 2014143078 A | 8/2014 |
| JP | 2015228290 A | 12/2015 |
| JP | 201642461 A | 3/2016 |
| JP | 2016173875 A | 9/2016 |
| WO | 2013179924 A1 | 12/2013 |
| WO | 2014199782 A1 | 12/2014 |
| WO | 2015015894 A1 | 2/2015 |
| WO | 2016098216 A1 | 6/2016 |

OTHER PUBLICATIONS

"A Basic Guide to Particle Characterization", Malvern Instruments Worldwide—White Paper, May 2, 2012 (May 2, 2012), pp. 1-26.

* cited by examiner

NEGATIVE ELECTRODE FOR ELECTRIC DEVICE AND ELECTRIC DEVICE USING THE SAME

TECHNICAL FIELD

The present invention relates to a negative electrode for an electric device and an electric device using the same. In particular, the present invention relates to a negative electrode for an electric device with cycle durability improved, and an electric device using the same.

BACKGROUND

Recent electric devices having developed as drive power sources for electronic devices and vehicles, for example, have high cycle durability so as not to decrease the performance after repeated charge and discharge.

For example, Japanese Unexamined Patent Application Publication No. 2004-311429 discloses an electrode material for a lithium ion secondary battery including particles of a solid-state alloy mainly containing silicon. The particles of the solid-state alloy included in the electrode material include a microcrystalline or amorphous substance containing an element other than silicon and dispersed in microcrystalline silicon or amorphous silicon. The electrode material for a lithium ion secondary battery provided by Japanese Unexamined Patent Application Publication No. 2004-311429 has a high capacity with low resistance and high charge and discharge efficiency.

The electrode material disclosed in Japanese Unexamined Patent Application Publication No. 2004-311429 still does not have sufficient properties to be used for electric devices such as lithium ion secondary batteries that need to have much higher cycle durability.

SUMMARY

To solve the conventional problems described above, the present invention provides a negative electrode for an electric device with improved cycle durability, and an electric device using the same.

A negative electrode for an electric device according to an aspect of the present invention includes a carbon cover layer including a carbon material and covering a silicon-containing alloy, and a negative electrode electric conducting additive, in which a ratio of an average particle diameter of the silicon-containing alloy to an average particle diameter of the carbon material is set to a predetermined range.

DETAILED DESCRIPTION

Figure 1:
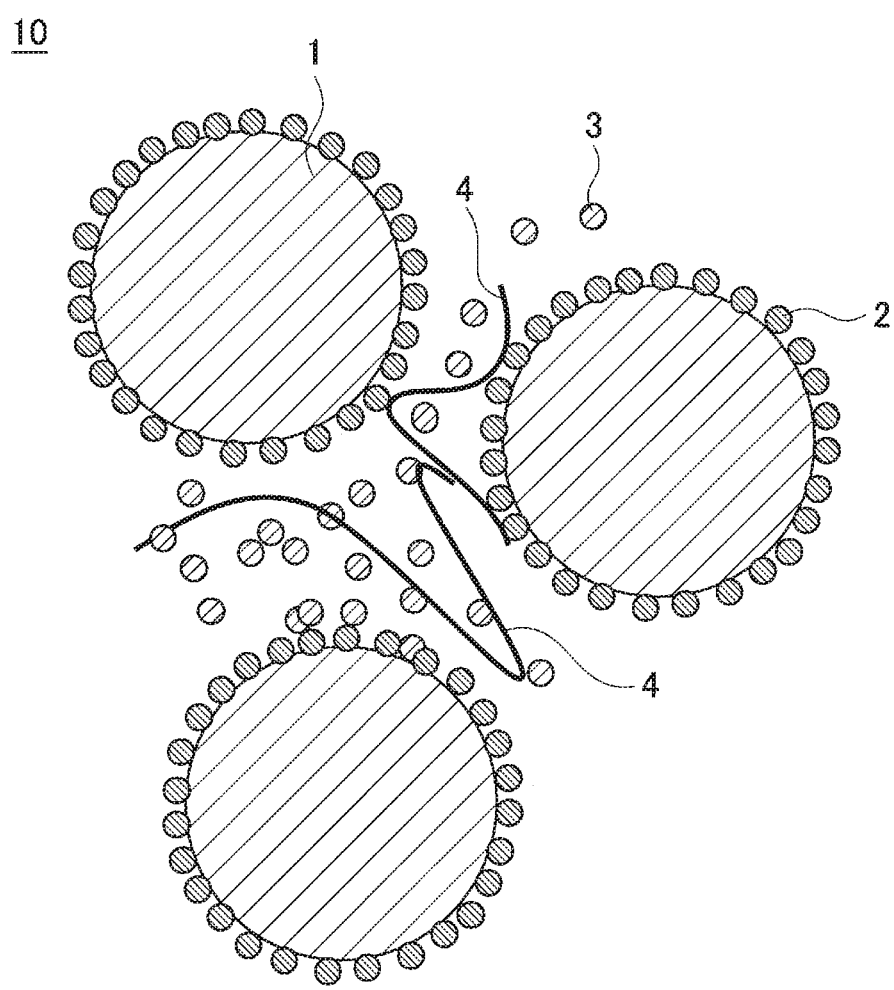
FIG. 1 is a schematic view illustrating a negative electrode for an electric device according to the present embodiment.

A negative electrode for an electric device and an electric device using the same will be described below with reference to the drawings. The dimensions of elements in the drawings may be exaggerated for illustration purposes, and are not necessarily drawn to scale.

[Negative Electrode 10 for Electric Device]

As illustrated in FIG. 1, a negative electrode 10 for an electric device according to the present embodiment includes a silicon-containing alloy 1 containing silicon and tin, a carbon cover layer 2 including a carbon material and covering the silicon-containing alloy 1, and a negative electrode electric conducting additive 3. The inclusion of the carbon cover layer 2 in the negative electrode 10 for an electric device decreases the contact area of the silicon-containing alloy 1 directly brought into contact with an electrolysis solution, for example, included in an electrolyte layer 30 in an electric device 100. The decrease in the contact area prevents depletion of the electrolysis solution or an excessive decomposition reaction of the electrolysis solution. The decrease in the contact area further prevents a side reaction product produced by excessive decomposition of the electrolysis solution so as not to reduce electrical conductivity in the negative electrode.

The inclusion of the carbon cover layer 2 in the negative electrode 10 for an electric device can also equalize the electrical conductivity on the surface of the silicon-containing alloy 1. This equalization can prevent degradation of the silicon-containing alloy 1 caused by local intercalation of lithium ions into the silicon-containing alloy 1 when the negative electrode 10 for an electric device is used for the electric device 100 such as a lithium ion secondary battery. The cycle durability of the electric device 100 thus can be improved.

According to the present embodiment, a ratio of an average particle diameter of the silicon-containing alloy 1 to an average particle diameter of the carbon material is set to 240 or greater. The ratio of the average particle diameters between the silicon-containing alloy 1 and the carbon material set to 240 or greater can cover the silicon-containing alloy 1 with the carbon material more uniformly. The uniform covering can further decrease the contact between the silicon-containing alloy 1 and the electrolysis solution. The decrease in the contact area can improve the cycle durability of the electric device 100. The mechanism described above is based on the presumption, which does not limit the present embodiment.

<Silicon-Containing Alloy 1>

The negative electrode 10 for an electric device according to the present embodiment includes the silicon-containing alloy 1 containing silicon and tin. The silicon-containing alloy 1 serves as a negative electrode active material capable of absorbing and releasing lithium. The present embodiment using the silicon-containing alloy 1 described above can avoid a change in volume caused when silicon is alloyed with lithium ions during charge and discharge, so as to promote the cycle durability of the electric device 100.

The silicon content of the silicon-containing alloy 1 is preferably 20% by mass or greater of the entire amount of the silicon-containing alloy 1. The silicon content of the silicon-containing alloy 1 set to 20% by mass or greater can prevent amorphous-crystal phase transition, so as to improve the cycle durability of the electric device 100. The silicon-containing alloy 1 may be prepared by a mechanical alloying method or an arc plasma melting method, for example.

The silicon-containing alloy 1 according to the present embodiment preferably contains elements of Si, Sn, and M, where M is at least an element selected from the group consisting of transition elements, B, C, Mg, Al, and Zn. The transition elements belong in the groups from group 3 to group 11 in the periodic table. The use of the silicon-containing alloy 1 described above can enhance the cycle durability of the electric device 100.

The element M is more preferably at least an element selected from the group consisting of B, C, Mg, Al, Ti, V, Cr, Mn, Fe, Co, Ni, Cu, Zn, Zr, Nb, Mo, and Ta. The element M is still more preferably at least an element selected from the group consisting of C, Al, Ti, V, and Zn. The element M is most preferably at least either Al or Ti. The silicon-containing alloy 1 containing the elements as described above can improve the cycle durability of the electric device 100.

The silicon-containing alloy 1 containing the elements of Si, Sn, and M may contain inevitable impurities. Inevitable impurities refer to substances contained in a raw material or inevitably mixed during the manufacturing process. Such inevitable impurities are fundamentally unnecessary but are allowed to be contained since the content thereof is quite small and has little influence on the properties of the silicon-containing alloy 1. The content of inevitable impurities is preferably less than 0.5% by mass, more preferably less than 0.1% by mass, and still more preferably less than 0.01% by mass, with respect to the entire amount of the silicon-containing alloy 1.

The general formula of the silicon-containing alloy 1 is preferably Si—Sn-M, and more preferably Si—Sn—Ti or Si—Sn—Ti—Al. The general formula of Si—Sn—Ti is preferably defined by the Sn content in a range of 7% by mass or greater to 30% by mass or less, the Ti content in a range of greater than 0% by mass to 37% by mass or less, and the residue of Si and inevitable impurities. Alternatively, the general formula of Si—Sn—Ti is preferably defined by the Sn content in a range of 30% by mass or greater to 51% by mass or less, the Ti content in a range of greater than 0% by mass to 35% by mass or less, and the residue of Si and inevitable impurities. The general formula of Si—Sn—Ti is more preferably defined by the Sn content in a range of 7% by mass or greater to 30% by mass or less, the Ti content in a range of greater than 7% by mass to 37% by mass or less, and the residue of Si and inevitable impurities. Alternatively, the general formula of Si—Sn—Ti is more preferably defined by the Sn content in a range of 30% by mass or greater to 51% by mass or less, the Ti content in a range of greater than 7% by mass to 35% by mass or less, and the residue of Si and inevitable impurities. The general formula of Si—Sn—Ti is still more preferably defined by the Sn content in a range of 7% by mass or greater to 30% by mass or less, the Ti content in a range of 18% by mass or greater to 37% by mass or less, and the residue of Si and inevitable impurities. Alternatively, the general formula of Si—Sn—Ti is still more preferably defined by the Sn content in a range of 30% by mass or greater to 51% by mass or less, the Ti content in a range of greater than 7% by mass to 20% by mass or less, and the residue of Si and inevitable impurities. The general formula of Si—Sn—Ti is most preferably defined by the Sn content in a range of 7% by mass or greater to 21% by mass or less, the Ti content in a range of 24% by mass or greater to 37% by mass or less, and the residue of Si and inevitable impurities. Setting the contents of the respective elements in the above ranges can provide a lithium ion secondary battery having high cycle durability.

The general formula of Si—Sn—Ti—Al is preferably defined by the Sn content in a range of 2% by mass or greater to 10% by mass or less, the Ti content in a range of 25% by mass or greater to 35% by mass or less, the Al content in a range of 0.3% by mass or greater to 3% by mass or less, and the residue of Si and inevitable impurities. The contents of the elements set in the respective ranges described above can improve the cycle durability of the electric device 100. The Sn content is more preferably 3% by mass or greater. The Sn content is more preferably 9% by mass or less, and still more preferably 8.5% by mass or less. The Ti content is more preferably 28% by mass or greater, and still more preferably 29% by mass or greater. The Ti content is more preferably 34% by mass or less, still more preferably 33% by mass or less, particularly preferably 32% by mass or less, and most preferably 31% by mass or less. The Al content is more preferably 0.35% by mass or greater, and still more preferably 0.4% by mass or greater. The Al content is more preferably 2.5% by mass or less, and still more preferably 2.0% by mass or less. The Si content is preferably 58% by mass or greater, more preferably 58.5% by mass or greater, and still more preferably 59% by mass or greater. The Si content is preferably 70% by mass or less, more preferably 68% by mass or less, still more preferably 67% by mass or less, and particularly preferably 66% by mass or less.

The average particle diameter (D50) of the silicon-containing alloy 1 may be determined as appropriate, but is preferably set in a range of greater than 0.01 μm to smaller than 20 μm. The average particle diameter (D50) of the silicon-containing alloy 1 set to the range described above can lead the carbon cover layer 2 to efficiently cover the surface of the silicon-containing alloy 1. This average particle diameter can also prevent expansion and contraction of the silicon-containing alloy 1 and effectively suppress and avoid separation of the covering carbon cover layer 2 from the surface of the silicon-containing alloy 1. The cycle durability of the electric device 100 can be promoted accordingly. The average particle diameter (D50) of the silicon-containing alloy 1 is more preferably set in a range of 0.4 μm to 10 μm, and still more preferably in a range of 2.5 μm to 8 μm. As used herein, the term "D50" refers to a particle diameter when a cumulative value of particle size distribution is 50% by mass, which may be measured by a laser diffraction method, for example.

The negative electrode 10 for an electric device according to the present embodiment includes the silicon-containing alloy 1, or may include a negative electrode active material other than the silicon-containing alloy 1. The negative electrode active material other than the silicon-containing alloy 1 may be any material that can absorb and release lithium. Examples of negative electrode active materials other than the silicon-containing alloy 1 include a carbon material, metal alloyed with lithium such as silicon, an alloy of silicon and other metal, and an oxide containing these metals.

<Carbon Cover Layer 2>

The negative electrode 10 for an electric device according to the present embodiment includes the carbon cover layer 2 including a carbon material and covering the silicon-containing alloy 1. The inclusion of the carbon cover layer 2 in the negative electrode 10 for an electric device prevents an excessive decomposition reaction of the electrolysis solution due to a direct contact of the silicon-containing alloy 1 with the electrolysis solution in the electric device 100, or avoids local intercalation of lithium ions into the silicon-containing alloy 1. As used herein, the phrase "covering the silicon-containing alloy 1" refers to a state in which the silicon-containing alloy 1 and the carbon cover layer 2 are chemically or physically bonded together.

The proportion of the area in which the surface of the silicon-containing alloy 1 is covered with the carbon cover layer 2 is preferably in a range of 90% to 100%, more preferably in a range of 95% to 100%, and still more preferably in a range of 99% to 100%. The proportion of the area of the silicon-containing alloy 1 covered with the carbon cover layer 2 set to the above range can improve the charge and discharge efficiency and the cycle durability.

The carbon material contains 50% by mass or greater of carbon. The carbon material preferably contains 80% by mass or greater of carbon, more preferably contains 90% by mass or greater of carbon, still more preferably contains 95% by mass or greater of carbon, and particularly preferably contains 99% by mass or greater of carbon. The carbon material containing carbon in the above range can improve the electrical conductivity on the surface of the silicon-containing alloy 1.

The carbon material preferably, but not necessarily, has low crystallinity. The low crystallinity of the carbon material barely causes intercalation/release of lithium ions, so as to facilitate the retention of the silicon-containing alloy 1 in the covered state. Examples of materials used as the carbon material include acetylene black, furnace black, carbon black, channel black, and graphite. The carbon material is preferably acetylene black or carbon fiber selected from the above materials due to lower crystallinity.

The carbon material may have any shape, and may be in a particle state or in a fibrous state. The carbon material is preferably in a particle state in view of facilitation of covering, and is preferably in a fibrous state in view of electrical conductivity.

The carbon material may have any size. When the carbon material is in a particle state, for example, the average particle diameter (D50) is preferably set in a range of 10 nm to 200 nm, and more preferably in a range of 20 nm to 150 nm. The carbon material with the size in the above range can facilitate the covering of the surface of the silicon-containing alloy 1 with the carbon cover layer 2 in a uniform state. As described above, the term "D50" refers to a particle diameter when a cumulative value of particle size distribution is 50% by mass, which may be measured by a laser diffraction method, for example.

When the carbon material is in a fibrous state, for example, the length of the carbon material is preferably set in a range of 5 μm to 20 μm, and more preferably in a range of 8 μm to 15 μm. When the carbon material is in a fibrous state, the diameter of the carbon material is preferably set in a range of 20 nm to 500 nm, and more preferably in a range of 50 nm to 300 nm. The carbon material having such a size can facilitate the covering of the surface of the silicon-containing alloy 1 with the carbon cover layer 2 in a uniform state. The length and the diameter of the carbon material in a fibrous state may each be calculated as an average value of several to several tens of pieces actually observed with a transmission electron microscope (TEM) or a scanning electron microscope (SEM), for example.

The ratio of the average particle diameter of the silicon-containing alloy 1 to the average particle diameter of the carbon material is set to 240 or greater. The ratio of the average particle diameters between the silicon-containing alloy 1 and the carbon material set to 240 or greater can cover the silicon-containing alloy 1 with the carbon material more uniformly. The uniform covering can further decrease the contact between the silicon-containing alloy 1 and the electrolysis solution. The decrease in the contact area can improve the cycle durability of the electric device 100 accordingly. The ratio of the average particle diameter of the silicon-containing alloy 1 to the average particle diameter of the carbon material is more preferably set to 270 or greater.

The amount of DBP oil absorption of the carbon material is preferably set to 240 mL/100 g or greater. The amount of DBP oil absorption set to 240 mL/100 g or greater can allow the carbon material to hold a sufficient amount of the electrolysis solution to further equalize the electrical conductivity of the silicon-containing alloy 1, and accordingly, can improve the cycle durability of the electric device 100. The amount of DBP oil absorption of the carbon material is more preferably set to 270 mL/100 g or greater.

The amount of DBP oil absorption can be obtained in accordance with Method B (spatula-kneading method) prescribed in JIS K6221 (1975) according to the following equation:

$$[\text{DBP oil absorption amount: mL/100 g}] = [\text{amount of oil used until end point: ml}]/[\text{mass of dried sample: g}] \times 100 \qquad [\text{Math. 1}]$$

where the end point refers to a point of an entirely aggregated mass, and DBP is an abbreviation for dibutyl phthalate with a density (ρ) in a range of 1.042 g/cm$^3$ to 1.047 g/cm$^3$.

The specific surface area of the carbon material may be determined as appropriate, but is preferably set in a range of 7.7 m2/g to 206 m2/g, more preferably in a range of 13.1 m2/g to 206 m2/g, and still more preferably in a range of 133 m2/g to 206 m2/g. The specific surface area set in the above range can cover a larger area of the silicon-containing alloy 1 with the carbon cover layer 2. The contact between the silicon-containing alloy 1 and the electrolysis solution thus further decreases, so as to achieve the electrical conductivity on the surface of the silicon-containing alloy 1 more equally. The specific surface area of the carbon cover layer 2 may be measured by a BET method causing gas adsorption using nitrogen.

The carbon material may be chemically or physically bonded to the surface of the silicon-containing alloy 1 by any method. Examples of methods include a method of embedding at least part of the carbon cover layer 2 in the silicon-containing alloy 1 by shearing so as to be physically bonded together, and a method of chemically bonding the silicon-containing alloy 1 and the carbon cover layer 2 via a functional group. More specific examples of methods of chemically or physically bonding the carbon material to the surface of the silicon-containing alloy 1 include a mechanochemical method, a liquid-phase method, a sintering method, and a chemical vapor deposition (CVD) method. The speed of revolution (treatment revolution speed) in the case of using the mechanochemical method is preferably set in a range of 3000 rpm to 8000 rpm, and more preferably in a range of 4000 rpm to 7000 rpm. The load power is preferably set in a range of 200 W to 400 W, and more preferably in a range of 250 W to 300 W. The treatment time is preferably set in a range of 10 minutes to 60 minutes, and more preferably in a range of 20 minutes to 50 minutes. The mechanochemical method applied under the above conditions can cover the surface of the silicon-containing alloy 1 with the carbon material uniformly.

The mixing ratio between the silicon-containing alloy 1 and the carbon cover layer 2 when the silicon-containing alloy 1 is covered with the carbon material may be determined as appropriate. The content of the carbon material is preferably set in a range of 0.1% to 5% by mass, and more preferably in a range of 0.5% to 3% by mass, with respect to 100% by mass of the silicon-containing alloy 1 and the carbon cover layer 2 mixed together. Setting the content of the carbon material in the above range can easily regulate the proportion of the area of the silicon-containing alloy 1 covered with the carbon cover layer 2 to be set in the preferable range described above.

The carbon material content of the entire negative electrode active material layer 11 is preferably set to 1% by mass or less. Setting the content of the carbon material to 1% by mass or less can minimize the direct contact of the silicon-containing alloy 1 with the electrolysis solution, for example, so as to equalize the electrical conductivity on the surface of the silicon-containing alloy 1. In addition, an electronic network between the respective silicon-containing alloys 1 is established effectively, and the negative electrode electric conducting additive 3 is intertwined with the silicon-containing alloys 1, so as to prevent expansion and contraction of the silicon-containing alloy 1 during charge and discharge. The interaction between the carbon material and the negative electrode electric conducting additive 3 can improve a discharge capacity retention rate accordingly. The carbon material content of the entire negative electrode active material layer 11 is more preferably set to 0.2% by mass or greater, still more preferably 0.4% by mass or greater, and particularly preferably 0.6% by mass or greater.

The negative electrode active material layer 11 may include the silicon-containing alloy 1, the carbon cover layer 2, and the negative electrode electric conducting additive 3, as described below. The negative electrode active material layer 11 can be arranged on at least one of the surfaces of a negative electrode current collector 12. Namely, the negative electrode 10 for an electric device according to the present embodiment includes the negative electrode current collector 12, and the negative electrode active material layer 11 including the silicon-containing alloy 1, the carbon cover layer 2, and the negative electrode electric conducting additive 3 and arranged on at least one of the surfaces of the negative electrode current collector 12. The content of the carbon material in the negative electrode active material layer 11 is preferably set to 1% by mass or less. Setting the content of the carbon material to 1% by mass or less can improve the cycle durability due to the interaction between the carbon material and the negative electrode electric conducting additive 3.

<Negative Electrode Electric Conducting Additive 3>

The negative electrode 10 for an electric device includes the negative electrode electric conducting additive 3. The negative electrode electric conducting additive 3 can establish an electronic network inside the negative electrode active material layer 11, and can increase the discharge capacity of the electric device 100. An example of a material included in the negative electrode electric conducting additive 3 is a carbon material, which may be carbon black such as acetylene black, graphite, and carbon fiber. These materials may be used singly, or two or more of these materials may be combined together. The content of the negative electrode electric conducting additive 3 is preferably set in a range of 1% to 10% by mass, more preferably in a range of 2% to 6% by mass, and still more preferably in a range of 2.5% to 4% by mass, with respect to the entire amount of the negative electrode active material layer 11. The negative electrode electric conducting additive 3 with the content in the above range can improve the electrical conductivity of the negative electrode active material layer 11.

A ratio of the content of the negative electrode electric conducting additive 3 to the content of the carbon material preferably exceeds one. The ratio of the contents between the carbon material and the negative electrode electric conducting additive 3 exceeding one can minimize the direct contact of the silicon-containing alloy 1 with the electrolysis solution, for example, so as to equalize the electrical conductivity on the surface of the silicon-containing alloy 1. In addition, the electronic network between the respective silicon-containing alloys 1 is established effectively, and the negative electrode electric conducting additive 3 is intertwined with the silicon-containing alloys 1, so as to prevent expansion and contraction of the silicon-containing alloy 1 during charge and discharge. The interaction between the carbon material and the negative electrode electric conducting additive 3 can improve the cycle durability accordingly. The ratio of the content of the negative electrode electric conducting additive 3 to the content of the carbon material is more preferably two or greater, and still more preferably three or greater. The ratio of the content of the negative electrode electric conducting additive 3 to the content of the carbon material is preferably six or smaller, and more preferably five or smaller.

The specific surface area of the negative electrode electric conducting additive 3 is preferably, but not necessarily, set in a range of 1 m2/g to 100 m2/g, more preferably in a range of 1 m2/g to 50 m2/g, and still more preferably in a range of 3 m2/g to 10 m2/g. The specific surface area of the negative electrode electric conducting additive 3 set in the above range leads the proportion of the negative electrode electric conducting additive 3 bonded to a negative electrode binder 4 to decrease, so as to prevent a decrease in performance of the negative electrode binder 4 and keep the strength of the negative electrode 10 for an electric device. The specific surface area of the negative electrode electric conducting additive 3 can be measured by a BET method causing gas adsorption using nitrogen.

A ratio of the specific surface area of the carbon material to the specific surface area of the negative electrode electric conducting additive 3 is seven or greater. The ratio between the specific surface areas set to seven or greater can equalize the electrical conductivity on the surface of the silicon-containing alloy 1, and can keep the strength of the negative electrode 10 for an electric device. The cycle durability of the electric device 100 can be improved accordingly. The ratio of the specific surface area of the carbon material to the specific surface area of the negative electrode electric conducting additive 3 is preferably 10 or greater, more preferably 15 or greater, still more preferably 18 or greater, and most preferably 26 or greater. The ratio of the specific surface area of the carbon material to the specific surface area of the negative electrode electric conducting additive 3 is preferably 40 or smaller, more preferably 35 or smaller, still more preferably 30 or smaller, and most preferably 27 or smaller.

The negative electrode 10 for an electric device may include the negative electrode current collector 12, and the negative electrode active material layer 11 arranged on at least one of the surfaces of the negative electrode current collector 12. The negative electrode active material layer 11 may be formed such that a solvent is added to the silicon-containing alloy 1, the negative electrode electric conducting additive 3, and the negative electrode binder 4 described above so as to prepare slurry, and the prepared slurry is applied to the negative electrode current collector 12 and then dried. The negative electrode active material layer 11 thus includes the silicon-containing alloy 1, the negative electrode electric conducting additive 3, and other materials.

<Negative Electrode Binder 4>

The negative electrode active material layer 11 may include the negative electrode binder 4 in addition to the silicon-containing alloy 1 and the negative electrode electric conducting additive 3. The negative electrode 10 for an electric device thus may include the negative electrode binder 4. The negative electrode binder 4 can couple the respective silicon-containing alloys 1 together or couple the silicon-containing alloy 1 to the negative electrode electric conducting additive 3. Examples of materials included in the negative electrode binder 4 used in the negative electrode 10 for an electric device include thermoplastic resin such as polyethylene (PE), polypropylene (PP), polyethylene terephthalate (PET), polymethyl acrylate (PMA), polymethyl methacrylate (PMMA), polyethernitrile (PEN), polyacrylonitrile (PAN), polyimide (PI), polyamide (PA), polyamide-imide (PAI), carboxymethylcellulose (CMC), ethylene-vinyl acetate copolymer (EVA), polyvinylidene chloride (PVC), polyvinylidene fluoride (PVDF), polytetrafluoroethylene (PTFE), and polyvinyl fluoride (PVF), thermosetting resin such as epoxy resin, and elastomer such as styrene-butadiene rubber (SBR), isoprene rubber (IR), and butadiene rubber (BR). These materials for the negative electrode binder 4 may be used singly, or two or more of the materials may be combined together. At least one material selected from the group consisting of polyimide (PI), polyamide (PA), and polyamide-imide (PAI) is particularly preferable, since these materials have high adhesive and heat resistance necessary for the negative electrode binder 4. The content of the negative electrode binder 4 included in the negative electrode active material layer 11 is preferably, but not necessarily, set in a range of 0.5% to 15% by mass, and more preferably in a range of 1% to 10% by mass, with respect to the entire amount of the negative electrode active material layer 11.

<Negative Electrode Current Collector 12>

The negative electrode 10 for an electric device can include the negative electrode current collector 12. The negative electrode current collector 12 may be arranged so as to allow electrons to communicate between the negative electrode active material layer 11 and a negative electrode tab 63 described below. A material included in the negative electrode current collector 12 is preferably metal such as copper (Cu), titanium (Ti), nickel (Ni), and stainless steel (SUS). Copper (Cu) is particularly preferable to be used as a material for the negative electrode current collector 12.

As described above, the negative electrode 10 for an electric device according to the present embodiment includes the silicon-containing alloy 1 containing silicon and tin, the carbon cover layer 2 including the carbon material and covering the silicon-containing alloy 1, and the negative electrode electric conducting additive 3. The ratio of the average particle diameter of the silicon-containing alloy 1 to the average particle diameter of the carbon material is set to 240 or greater. The negative electrode 10 for an electric device according to the present embodiment can enhance the cycle durability when used in the electric device 100.

Electric Device 100

The electric device 100 according to the present embodiment includes the negative electrode 10 for an electric device described above. The electric device 100 according to the present embodiment thus can improve the cycle durability. Examples of devices used as the electric device 100 include a lithium ion secondary battery and an electrical double-layer capacitor as described below.

Figure 2:
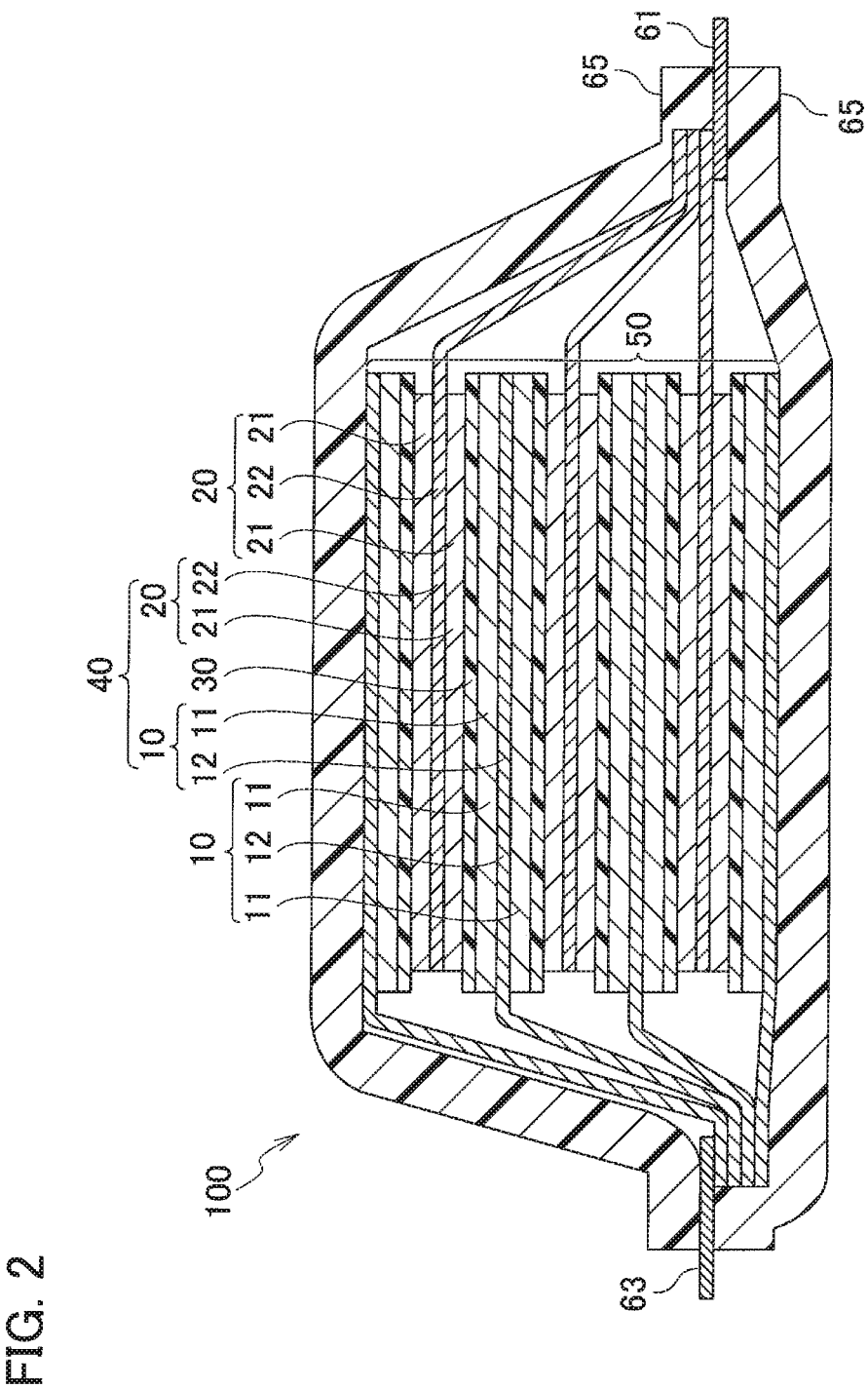
FIG. 2 is a schematic cross-sectional view illustrating an electric device according to the present embodiment.

The electric device 100 according to the present embodiment includes the negative electrode 10 for an electric device. The electric device 100 according to the present embodiment can improve the cycle durability. The electric device 100 can further include a positive electrode 20 for an electric device, the electrolyte layer 30, a positive electrode tab 61, the negative electrode tab 63, and an exterior member 65 as necessary, in addition to the negative electrode 10 for an electric device, as illustrated in FIG. 2. The electric device 100 can include the exterior member 65 and a battery element 50 housed in the exterior member 65. The battery element 50 may be formed such that a plurality of single cell layers 40 are stacked on one another. Each of the single cell layers 40 may include the positive electrode 20 for an electric device, the negative electrode 10 for an electric device, and the electrolyte layer 30 arranged between the positive electrode 20 for an electric device and the negative electrode 10 for an electric device. As illustrated in FIG. 2, the single cell layers 40 can be stacked and electrically connected parallel each other. The positive electrode tab 61 and the negative electrode tab 63 can lead current generated by the single cell layers 40 to the outside of the electric device 100.

The electric device 100 is not limited to the configuration illustrated in FIG. 2, and may be configured as a bipolar battery including a bipolar electrode in which the negative electrode active material layer 11 is arranged on one surface of a current collector, and a positive electrode active material layer 21 is arranged on the other surface of the current collector. The electric device 100 is not limited to the stacked structure, and may have a wound structure.

<Positive Electrode 20 for Electric Device>

The positive electrode 20 for an electric device may include a positive electrode current collector 22, and the positive electrode active material layer 21 arranged on at least one of the surfaces of the positive electrode current collector 22. The positive electrode 20 for an electric device includes the positive electrode active material layer 21 which may be formed such that a material included in the positive electrode active material layer 21 is dispersed in a solvent to prepare positive electrode slurry, and the positive electrode slurry is applied to the positive electrode current collector 22 and then dried. The positive electrode active material layer 21 may include a positive electrode active material, a positive electrode electric conducting additive, and a positive electrode binder, for example.

<Positive Electrode Active Material>

Examples of materials used as the positive electrode active material include a lithium-transition metal composite oxide, a lithium-transition metal phosphate compound, and a lithium-transition metal sulfate compound. Examples of the lithium-transition metal composite oxide include $LiMn_2O_4$, $LiCoO_2$, $LiNiO_2$, $Li(Ni-Mn-Co)O_2$, $Li(Li-Ni-Mn-Co)O_2$, and an oxide in which part of the transition metal contained in each of these composite oxides is replaced with other elements. The lithium-transition metal phosphate compound may be $LiFePO_4$. The lithium-transition metal sulfate compound may be $Li_xFe_2(SO_4)_3$.

The positive electrode active material preferably includes a solid solution lithium-containing transition metal oxide represented by a chemical formula: Li1.5[NiaCobMnc[Li]d]O3, where Li is lithium, Ni is nickel, Co is cobalt, Mn is manganese, and O is oxygen, and a, b, c, and d satisfy the following relationships: $0<a<1.4$, $0 \leq b<1.4$, $0<c<1.4$, $0.1<d \leq 0.4$, $a+b+c+d=1.5$, and $1.1 \leq a+b+c<1.4$. The use of the positive electrode active material described above can increase the discharge capacity of the electric device 100. The use of the positive electrode active material described above can also increase a charge-discharge potential of the electric device 100. The compositions of the respective elements can be measured by an inductively-coupled plasma (ICP) atomic emission spectroscopy.

In the above chemical formula, a, b, c, and d preferably satisfy the following relationships: $0<a<1.35$, $0 \leq b<1.35$, $0<c<1.35$, $0.15<d \leq 0.35$, $a+b+c+d=1.5$, and $1.15 \leq a+b+c<1.35$. In the above chemical formula, a, b, c, and d more preferably satisfy the following relationships: $0<a<1.3$, $0 \leq b<1.3$, $0<c<1.3$, $0.15<d \leq 0.35$, $a+b+c+d=1.5$, and $1.2 \leq a+$ b+c<1.3. The use of the positive electrode active material described above can improve the discharge capacity of the electric device 100.

An average primary particle diameter of the positive electrode active material is preferably set in a range of 50 nm to 2000 nm, more preferably in a range of 100 nm to 1000 nm, and still more preferably in a range of 200 nm to 400 nm. The positive electrode active material with the average primary particle diameter set in the above range can improve the discharge capacity of the electric device 100. The average primary particle diameter of the positive electrode active material may be calculated as an average value of particle diameters of several to several tens of pieces actually observed with a transmission electron microscope (TEM) or a scanning electron microscope (SEM), for example.

<Positive Electrode Electric Conducting Additive>

The positive electrode electric conducting additive can establish an electronic network inside the positive electrode active material layer 21, and can increase the discharge capacity of the electric device 100. The content of the positive electrode electric conducting additive is preferably set in a range of 1% to 10% by mass, and more preferably in a range of 2% to 6% by mass, with respect to the entire amount of the positive electrode active material layer 21. The positive electrode electric conducting additive with the content in the above range can improve the electrical conductivity of the positive electrode active material layer 21.

The positive electrode electric conducting additive preferably includes a fibrous electric conducting additive and a particle electric conducting additive. The combined effect of the plural kinds of the electric conducting additives can improve the cycle durability and avoid a voltage drop of the electric device 100 at a low potential, as compared with a case in which the fibrous electric conducting additive or the particle electric conducting additive is used singly.

The electric device 100 according to the present embodiment preferably includes both the negative electrode 10 for an electric device and the positive electrode 20 for an electric device. The positive electrode 20 for an electric device preferably includes the positive electrode active material including the solid solution lithium-containing transition metal oxide represented by the chemical formula: $Li_{1.5}[Ni_aCo_bMn_c[Li]_d]O_3$, the fibrous electric conducting additive, and the particle electric conducting additive. In the above chemical formula, Li is lithium, Ni is nickel, Co is cobalt, Mn is manganese, and O is oxygen, and a, b, c, and d satisfy the following relationships: $0<a<1.4$, $0 \leq b<1.4$, $0<c<1.4$, $0.1<d \leq 0.4$, $a+b+c+d=1.5$, and $1.1 \leq a+b+c<1.4$. The positive electrode 20 for an electric device as described above can improve the cycle durability and avoid a voltage drop of the electric device 100 at a low potential, as compared with the case in which the fibrous electric conducting additive or the particle electric conducting additive is used singly.

As used herein, the fibrous electric conducting additive refers to an electric conducting additive in a fibrous state. The fibrous state encompasses an elongated shape such as a pillar shape, for example, which may be either a straight state or a curved state. The fibrous state may be a tube-like hollow state that has a shape of fiber. The present embodiment using the fibrous electric conducting additive can establish a three-dimensional electronic network, so as to improve the electrical conductivity between the respective positive electrode active materials.

A material used for the fibrous electric conducting additive may be carbon fiber such as carbon nanotube, carbon nanohorn, carbon nanofiber, carbon nanofilament, carbon fibril, and vapor-deposited carbon fiber.

The fiber diameter of the fibrous electric conducting additive is preferably set in a range of 5 nm or greater to 50 nm or smaller. The fiber diameter of the fibrous electric conducting additive is more preferably set in a range of 7 nm or greater to 20 nm or smaller, and still more preferably in a range of 8 nm or greater to 15 nm or smaller. The fibrous electric conducting additive with the fiber diameter set in the above range can avoid a voltage drop of the electric device 100 at a low potential more effectively. The fiber diameter of the fibrous electric conducting additive may be calculated as an average value of fiber diameters of several to several tens of pieces actually observed with a transmission electron microscope (TEM) or a scanning electron microscope (SEM), for example.

The fiber length of the fibrous electric conducting additive is preferably set in a range of 50 nm or greater to 50 μm or smaller, and more preferably in a range of 500 nm or greater to 20 μm or smaller. The fibrous electric conducting additive with the fiber length set in the above range can increase the electrical conductivity between the respective positive electrode active materials and can improve the cycle durability. The fiber length of the fibrous electric conducting additive may be calculated as an average value of fiber lengths of several to several tens of pieces actually observed with a transmission electron microscope (TEM) or a scanning electron microscope (SEM), for example.

An aspect ratio of the fibrous electric conducting additive is preferably set to 10 or greater. The fibrous electric conducting additive with the aspect ratio set to 10 or greater can increase the electrical conductivity between the respective positive electrode active materials and can improve the cycle durability. The aspect ratio of the fibrous electric conducting additive is more preferably set in a range of 10 or greater to 1000 or smaller, and still more preferably in a range of 20 or greater to 1000 or smaller.

The fiber diameter of the fibrous electric conducting additive is preferably set in a range of 5 nm or greater to 50 nm or smaller, and the aspect ratio of the fibrous electric conducting additive is preferably set to 10 or greater. The fibrous electric conducting additive with the fiber diameter and the aspect ratio set as described above can increase the electrical conductivity between the respective positive electrode active materials and can improve the cycle durability.

A specific surface area of the fibrous electric conducting additive is preferably set in a range of 10 m2/g or greater to 300 m2/g or smaller, more preferably in a range of 100 m2/g or greater to 250 m2/g or smaller, and still more preferably in a range of 170 m2/g or greater to 210 m2/g or smaller. The fibrous electric conducting additive with the specific surface area set in the above range can increase the electrical conductivity between the respective positive electrode active materials and can improve the cycle durability. The specific surface area of the fibrous electric conducting additive may be measured by a BET method causing gas adsorption using nitrogen.

As used herein, the particle electric conducting additive refers to an electric conducting additive in a particle state. The major axis of the particle electric conducting additive is smaller than the major axis of the fibrous electric conducting additive. The particle state encompasses a spherical shape, a hemispherical shape, an elliptical shape, a short-chain shape, a scale shape, a columnar shape, and a polygonal prism shape, and may be either a straight state or a curved state. The particle state may also be a tube-like hollow state that has a particle shape. The particle electric conducting additive as described above is presumed to cover the surface of the positive electrode active material evenly and thus decrease a reaction overvoltage at a low potential which is characteristic of the solid solution lithium-containing transition metal oxide. The particle electric conducting additive is thus presumed to avoid a voltage drop of the electric device 100 at a low potential.

A material used for the particle electric conducting additive may be carbon powder such as carbon black and graphite. Examples of carbon black include acetylene black, furnace black, channel black, and thermal black. Examples of graphite include natural graphite and artificial graphite.

An average primary particle diameter of the particle electric conducting additive is preferably set to 45 nm or smaller. The particle electric conducting additive with the average primary particle diameter set to 45 nm or smaller can cover the surface of the positive electrode active material more evenly, so as to effectively avoid a voltage drop at a low potential. The average primary particle diameter of the particle electric conducting additive is more preferably set in a range of 0.1 nm or greater to 35 nm or smaller, and still more preferably in a range of 1 nm or greater to 30 nm or smaller. The average primary particle diameter of the particle electric conducting additive may be calculated as an average value of particle diameters of several to several tens of pieces actually observed with a transmission electron microscope (TEM) or a scanning electron microscope (SEM), for example.

A specific surface area of the particle electric conducting additive is preferably set to 110 m2/g or greater. The particle electric conducting additive with the average primary particle diameter set to 110 m2/g or greater can increase the contact area between the particle electric conducting additive and the positive electrode active material, so as to effectively avoid a voltage drop at a low potential. The specific surface area of the particle electric conducting additive is more preferably set to 150 m2/g or greater, and still more preferably to 170 m2/g or greater. The specific surface area of the particle electric conducting additive is preferably set to 300 m2/g or smaller, more preferably 250 m2/g or smaller, and still more preferably 210 m2/g or smaller. The specific surface area of the particle electric conducting additive may be measured by a BET method causing gas adsorption using nitrogen.

The average primary particle diameter of the particle electric conducting additive is preferably set to 45 nm or smaller, and the specific surface area of the particle electric conducting additive is preferably set to 110 m2/g or greater. The particle electric conducting additive with the average primary particle diameter and the specific surface area set as described above can cover the surface of the positive electrode active material more evenly and increase the contact area between the particle electric conducting additive and the positive electrode active material, so as to avoid a voltage drop at a low potential more effectively.

A ratio of the specific surface area of the fibrous electric conducting additive to the specific surface area of the particle electric conducting additive is preferably set in a range of 0.6 or greater to 1.3 or less. Namely, a value obtained by dividing the specific surface area of the fibrous electric conducting additive by the specific surface area of the particle electric conducting additive preferably results in the range of 0.6 or greater to 1.3 or less. The ratio between the specific surface areas in this range can increase the cycle durability and avoid a voltage drop at a low potential. The ratio of the specific surface area of the fibrous electric conducting additive to the specific surface area of the particle electric conducting additive is more preferably set in a range of 0.7 or greater to 1.3 or less, still more preferably in a range of 0.8 or greater to 1.2 or less.

A ratio of a mass of the fibrous electric conducting additive to a mass of the particle electric conducting additive is preferably set to 0.8 or greater. Namely, a value obtained by dividing the mass of the fibrous electric conducting additive by the mass of the particle electric conducting additive preferably results in 0.8 or greater. The mass ratio in the positive electrode electric conducting additive set to 0.8 or greater can increase the cycle durability and avoid a voltage drop at a low potential. The ratio of the mass of the fibrous electric conducting additive to the mass of the particle electric conducting additive is more preferably set to 0.9 or greater. The ratio of the mass of the fibrous electric conducting additive to the mass of the particle electric conducting additive is preferably set to 2.5 or less, more preferably 2.2 or less, and still more preferably 2.1 or less. The ratio of the mass of the fibrous electric conducting additive to the mass of the particle electric conducting additive preferably exceeds 1, more preferably exceeds 1.3, and still more preferably exceeds 1.7.

A ratio of the average primary particle diameter of the positive electrode active material to the average primary particle diameter of the particle electric conducting additive is preferably set in a range of 5 to 100, more preferably in a range of 7 to 90, and still more preferably in a range of 9 to 80. The ratio of the average primary particle diameter of the positive electrode active material to the average primary particle diameter of the particle electric conducting additive set in the above range can increase the contact area between the positive electrode active material and the particle electric conducting additive, so as to prevent a voltage drop of the electric device 100 at a low potential.

The content of the carbon material included in the fibrous electric conducting additive and the particle electric conducting additive is preferably set to 80% by mass or greater, more preferably 90% by mass or greater, and still more preferably 95% by mass or greater. The content of the carbon material included in the positive electrode electric conducting additive is particularly preferably set to 98% by mass or greater, and most preferably 100% by mass. The carbon material included in the positive electrode electric conducting additive set to the above range can improve the electrical conductivity between the respective positive electrode active materials.

The content of the fibrous electric conducting additive is preferably set in a range of 0.1% to 5% by mass, and more preferably in a range of 1% to 3% by mass, with respect to the entire amount of the positive electrode active material layer 21. The content of the particle electric conducting additive is preferably set in a range of 0.1% to 5% by mass, and more preferably in a range of 1% to 3% by mass, with respect to the entire amount of the positive electrode active material layer 21. The fibrous electric conducting additive and the particle electric conducting additive with the contents each set in the above range can increase the cycle durability of the electric device 100 and avoid a voltage drop at a low potential.

<Positive Electrode Binder>

The positive electrode binder used in the positive electrode active material layer 21 may be the same as the negative electrode binder 4 used in the negative electrode active material layer 11. The content of the positive electrode binder included in the positive electrode active material layer 21 may be the same as the content of the negative electrode binder 4 included in the negative electrode active material layer 11.

<Positive Electrode Current Collector 22>

The positive electrode current collector 22 may be arranged so as to allow electrons to communicate between the positive electrode active material layer 21 and the positive electrode tab 61 described below. A material included in the positive electrode current collector 22 is preferably metal such as aluminum (Al), titanium (Ti), nickel (Ni), and stainless steel (SUS). Aluminum (Al) is particularly preferable to be used as a material for the positive electrode current collector 22.

<Electrolyte Layer 30>

The electric device 100 can include the electrolyte layer 30 arranged between the negative electrode 10 for an electric device and the positive electrode 20 for an electric device. The electrolyte layer 30 separates the negative electrode 10 for an electric device and the positive electrode 20 for an electric device and allows lithium ions to move therebetween. A film thickness of the electrolyte layer 30 is preferably set in a range of 1 μm to 100 μm, and more preferably in a range of 5 μm to 50 μm in order to decrease internal resistance. The electrolyte layer 30 includes a non-aqueous electrolyte. The non-aqueous electrolyte may include a gel or solid polymer electrolyte in which lithium salt is dissolved in an ion conductive polymer, and a liquid electrolyte in which lithium salt is dissolved in an organic solvent, which are held in a porous substrate layer.

Examples of ion conductive polymers used in the polymer electrolyte include polyethylene oxide (PEO), polypropylene oxide (PPO), polyvinylidene fluoride (PVDF), hexafluoropropylene, polyethylene glycol (PEG), polyacrylonitrile (PAN), polymethyl methacrylate (PMMA), and a copolymer of these compounds.

The organic solvent used in the liquid electrolyte may be carbonate such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and methyl propyl carbonate (MPC). The lithium salt used in the liquid electrolyte may be a compound such as Li(CF3SO2)2N, Li(C2F5SO2)2N, LiPF6, LiBF4, LiAsF6, LiTaF6, LiClO4, and LiCF3SO3.

A material included in the porous substrate layer is preferably, but not limited to, thermoplastic resin such as polyethylene, polypropylene, and an ethylene-propylene copolymer. A porosity of the porous substrate layer is preferably, but not necessarily, set in a range of 40% to 85%. The porosity of 40% or greater can ensure sufficient ion conductivity. The porosity of 85% or less can keep appropriate strength of the porous substrate layer.

<Positive Electrode Tab 61 and Negative Electrode Tab 63>

The electric device 100 can include the positive electrode tab 61 electrically connecting the positive electrode current collector 22 and an external device of the electric device 100. The electric device 100 can include the negative electrode tab 63 electrically connecting the negative electrode current collector 12 and an external device of the electric device 100. A material included in each of the positive electrode tab 61 and the negative electrode tab 63 is determined as appropriate, and may be at least an element selected from the group consisting of aluminum, copper, titanium, and nickel. The materials used in the positive electrode tab 61 and the negative electrode tab 63 may be the same or different from each other.

<Exterior Member 65>

The electric device 100 according to the present embodiment can further include the exterior member 65 housing the battery element 50. The exterior member 65 may be made of a can or a film, for example. The shape of the exterior member 65 may be a cylindrical shape, a square shape, or a sheet-like shape, which is determined as appropriate. The exterior member 65 is preferably, but not necessarily, made of a film in view of a decrease in size and a reduction in weight. The film is particularly preferably a laminated film that includes aluminum, in order to ensure higher output power and cooling performance. The electric device 100 is preferably a flat laminated lithium ion secondary battery. The lithium ion secondary battery of this type is appropriate to the installation on a vehicle because such a lithium ion secondary battery can improve the discharge capacity and heat releasing performance. An example of the laminated film is a three-layer laminated film including PP, aluminum, and nylon.

The electric device 100 with the cycle durability improved is appropriate to, but is not limited to, the use for a vehicle. In particular, the electric device 100 according to the present embodiment is appropriate to the use as a driving power source for a vehicle.

Hereinafter, the present embodiment is described in more detail with reference to Examples and Comparative Examples, but is not limited to these examples.

EXAMPLE 1

<Preparation of Positive Electrode>

First, 2 mol/L of an aqueous solution including nickel acetate, cobalt acetate, and manganese acetate was prepared. The aqueous solution was then weighed to a predetermined amount to have a composition represented by the formula: $Li_{1.5}[Ni_{0.281}Co_{0.281}Mn_{0.688}[Li_{0.25}]]O_3$ so as to prepare a mixed solution. To the mixed solution, ammonia water was added dropwise until pH7 while stirring by a magnetic stirrer. To the mixed solution, 2 mol/L of an aqueous sodium carbonate solution was further added dropwise so as to precipitate a composite carbonate including nickel, cobalt, and manganese. The obtained precipitate was filtered with suction, washed, and then dried at about 120° C. for about five hours. The dried product was then calcined at about 500° C. for about five hours. To the calcined product, lithium hydroxide was added to have a composition represented by the formula: $Li_{1.5}[Ni_{0.281}Co_{0.281}Mn_{0.688}[Li_{0.25}]]O_3$, and was kneaded with an automatic mortar mixer for about 30 minutes. The kneaded product was heated in air at a temperature-increasing rate of 50° C. per hour and then baked at 750° C. for about 12 hours, so as to obtain a positive electrode active material.

To 94.5 parts by mass of the positive electrode active material obtained, 3.0 parts by mass of a positive electrode electric conducting additive and 30 parts by mass of a solvent were added and kneaded with a planetary mixer (HIVIS MIX Model 2P-03, available from PRIMIX Corporation) to prepare a positive electrode electric conducting additive solution. The above positive electrode electric conducting additive included 1.5 parts by mass of a fibrous electric conducting additive and 1.5 parts by mass of a particle electric conducting additive. The solvent used was N-methylpyrrolidone (NMP). The fiber diameter of the fibrous electric conducting additive was set to 11 nm, and the specific surface area was set to 200 m2/g. The average primary particle diameter of the particle electric conducting additive was set to 25 nm, and the specific surface area was set to 206 m2/g.

A positive electrode binder solution in which 2.5 parts by mass of a positive electrode binder was added to 45.0 parts by mass of a solvent was added to the positive electrode electric conducting additive solution obtained, and was then kneaded again with the planetary mixer so as to prepare positive electrode slurry. The solvent used was N-methylpyrrolidone (NMP). A solid content concentration of the positive electrode slurry was 57.1% by mass.

The positive electrode slurry obtained was applied to one surface of a positive electrode current collector with a bar coater such that a film thickness of a positive electrode active material layer after being dried resulted in 50 μm. The positive electrode current collector to which the positive electrode slurry was applied was placed on a hot plate and dried at 120° C. to 130° C. for 10 minutes so that the residue of the solvent resulted in 0.02% by mass. The dried product was press-molded with a roller press, and was then cut out such that the mass of the positive electrode active material layer was about 3.5 mg/cm2, the film thickness was about 50 μm, and the density was 2.70 g/cm3. The positive electrode current collector used was an aluminum foil with a thickness of 20 μm.

The cut-out product was placed in a vacuum dryer, and the pressure in the dryer was reduced to 100 mmHg (1.33×104 Pa) at a room temperature of 25° C. The temperature in the dryer was then increased to 120° C. at a rate of 10° C. per minute with nitrogen gas flowing at a rate of 100 cm3 per minute. The dryer was kept for 12 hours with the pressure reduced to 100 mmHg (1.33×104 Pa) at 120° C., and the temperature was then decreased to the room temperature of 25° C. The dried product obtained was used as a positive electrode.

<Preparation of Negative Electrode>

First, metal powder was alloyed with a planetary ball mill (P-6, available from FRITSCH, Germany) by mechanical alloying. In particular, metal powder prepared to be Si:Sn:Ti=64:6:30 in a mass ratio was placed in a container made of zirconia together with grinding balls made of zirconia. A base stand holding the container made of zirconia was then rotated at 600 rpm for 24 hours to alloy the metal powder. The base stand holding the container made of zirconia was further rotated at 400 rpm for one hour to grind the alloyed metal powder. An average particle diameter (D50) of the silicon-containing alloy obtained was 7 μm.

Subsequently, 76 parts by mass of the silicon-containing alloy and 0.8 parts by mass of a carbon material were mixed and then compounded together with NOBILTA (registered trademark) NOB-MINI (available from HOSOKAWA MICRON CORPORATION) so as to cover the silicon-containing alloy with the carbon material. The carbon material was acetylene black in a particle state with an average particle diameter (D50) of 24 nm and the DBP oil absorption amount of 285 mL/100 g. The compound treatment was performed under the conditions of a treatment revolution speed of 6000 rpm, a load power of 300 W, and a treatment time of 30 minutes.

Subsequently, 76.8 parts by mass of the silicon-containing alloy covered with the carbon material, 3.2 parts by mass of a negative electrode electric conducting additive, and 20 parts by mass of a negative electrode binder were dispersed in 100 parts by mass of N-methylpyrrolidone and mixed with a defoaming mixer to prepare negative electrode slurry. The negative electrode electric conducting additive was acetylene black, and the negative electrode binder was polyimide. A ratio of the content of the negative electrode electric conducting additive to the content of the carbon material was four. The defoaming mixer used was AR-100 available from THINKY CORPORATION.

The negative electrode slurry was applied evenly to one surface of a negative electrode current collector such that a thickness of a negative electrode active material layer after being dried resulted in 30 μm, and was then dried for 24 hours in a vacuum to obtain a negative electrode. The negative electrode current collector used was a copper foil with a thickness of 10 μm.

<Fabrication of Lithium Ion Secondary Battery>

The positive electrode obtained as described above and the negative electrode of metallic lithium were each punched into a circle with a diameter of 15 mm in a glovebox with an argon gas atmosphere, and two electrolyte layers were disposed between the positive electrode and the negative electrode facing each other, each electrolyte layer made of polypropylene and having a thickness of 20 μm. The positive electrode and the negative electrode were preliminarily dried with a vacuum dryer at 100° C. for two hours before the fabrication of a lithium ion secondary battery.

A stacked body of the negative electrode, the electrolyte layers, and the positive electrode was placed on the bottom of a coin cell (CR2032) made of stainless steel (SUS316). A gasket for keeping insulation between the positive electrode and the negative electrode was attached to the coil cell, and 150 μl of an electrolysis solution was injected thereto with a syringe. A spring and a spacer were stacked, and a top part of the coil cell was further stacked thereon and crimped to be sealed tightly, so as to fabricate the lithium ion secondary battery. The electrolyte layers and other members used in the coil cell were preliminarily dried at a room temperature for at least 24 hours in the glovebox with the argon gas atmosphere.

The electrolysis solution used was obtained such that an organic solvent was prepared in which ethylene carbonate (EC) and diethyl carbonate (DEC) were mixed at 1:2 in a volume ratio, and lithium hexafluorophosphate (LiPF6) was dissolved as supporting salt into the organic solvent so as to have a concentration of 1 mol/L.

<Activation Treatment>

The lithium ion secondary battery was completed through a single charge-discharge cycle of charging the coin cell obtained as described above at a constant current at a rate of 0.1 C until the maximum voltage of the cell reached 4.8 V at a room temperature of 25° C. and then discharging at a constant current at a rate of 0.1 C until the minimum voltage of the cell reached 2.0 V.

EXAMPLE 2

A lithium ion secondary battery of this example was fabricated in the same manner as Example 1, except that the content of the carbon material was 2% by mass, and the content of the negative electrode electric conducting additive was 2% by mass. The ratio of the content of the negative electrode electric conducting additive to the content of the carbon material was one.

EXAMPLE 3

A lithium ion secondary battery of this example was fabricated in the same manner as Example 1, except that the content of the carbon material was 4% by mass, and the content of the negative electrode electric conducting additive was 0% by mass. The ratio of the content of the negative electrode electric conducting additive to the content of the carbon material was zero.

EXAMPLE 4

A lithium ion secondary battery of this example was fabricated in the same manner as Example 1, except that the carbon material used was acetylene black in a particle state with the average particle diameter (D50) of 26 nm and the DBP oil absorption amount of 267 mL/100 g.

Comparative Example 1

A lithium ion secondary battery of this example was fabricated in the same manner as Example 1, except that the carbon material used was acetylene black in a particle state with the average particle diameter (D50) of 30 nm and the DBP oil absorption amount of 233 mL/100 g.

Comparative Example 2

A lithium ion secondary battery of this example was fabricated in the same manner as Comparative Example 1, except that the content of the carbon material was 2% by mass, and the content of the negative electrode electric conducting additive was 2% by mass. The ratio of the content of the negative electrode electric conducting additive to the content of the carbon material was one.

Comparative Example 3

A lithium ion secondary battery of this example was fabricated in the same manner as Comparative Example 1, except that the content of the carbon material was 4% by mass, and the content of the negative electrode electric conducting additive was 0% by mass. The ratio of the content of the negative electrode electric conducting additive to the content of the carbon material was zero.

Comparative Example 4

A lithium ion secondary battery of this example was fabricated in the same manner as Example 1, except that the carbon material used was acetylene black in a fibrous state with the average fiber length of 300 nm. The DBP oil absorption amount of the carbon material in this example was not measured.

Comparative Example 5

A lithium ion secondary battery of this example was fabricated in the same manner as Example 1, except that the carbon material used was acetylene black in a scale-like state with the average particle diameter (D50) of 3000 nm. The DBP oil absorption amount of the carbon material in this example was not measured.

Evaluation

The lithium ion secondary batteries obtained in the Examples and Comparative Examples were evaluated by measuring the coulombic efficiency and the discharge capacity retention rate at the 100th cycle. Table 1 lists the measurement results.

<Coulombic Efficiency>

The coulombic efficiency was measured to evaluate the charge-discharge efficiency as follows: A charge-discharge cycle of charging each battery at a constant current at a rate of 0.1 C until the maximum voltage of the battery reached 4.6 V at a room temperature of 25° C. and then discharging at a constant current at a rate of 1.0 C until the minimum voltage of the battery reached 2.0 V, was repeated 100 times. An average of the proportions of the discharge capacities to the charge capacities in the respective cycles was determined as the coulombic efficiency. The charge capacity in each cycle was an electric capacity when the battery was charged from 2.0 V to 4.6 V, and the discharge capacity was an electric capacity when the battery was discharged from 4.6 V to 2.0 V.

<Discharge Capacity Retention Rate at 100th Cycle>

The discharge capacity retention rate at the 100th cycle was measured to evaluate the cycle durability as follows: A charge-discharge cycle of charging each battery at a constant current at a rate of 0.1 C until the maximum voltage of the battery reached 4.6 V at a room temperature of 25° C. and then discharging at a constant current at a rate of 1.0 C until the minimum voltage of the battery reached 2.0 V, was repeated 100 times. The discharge capacities when the battery was discharged from 4.6 V to 2.0 V were measured at the 1st cycle and the 100th cycle, and the proportion of the discharge capacity at the 100th cycle to the discharge capacity at the 1st cycle was determined as the discharge capacity retention rate at the 100th cycle.

TABLE 1

| | Silicon-Containing Alloy | Carbon Material in Carbon Cover Layer | | | | Negative Electrode Electric Conducting Additive Content (mass %) | Average Particle Diameter of Silicon/Containing Alloy/Average particle Diameter of Carbon Material | Content of Electric Conductive Additive/ Content of Carbon Material | Coulombic Efficiency (%) | Discharge Capacity Retention Rate (%) |
|---|---|---|---|---|---|---|---|---|---|---|
| | Average Particle Diameter (μm) | State | Average Particle Diameter (nm) | Content (mass %) | DBP Oil Absorption Amount (ml/100 g) | | | | | |
| Example 1 | 7 | Particle | 24 | 0.8 | 285 | 3.2 | 292 | 4 | 99.5 | 94.7 |
| Example 2 | 7 | Particle | 24 | 2 | 285 | 2 | 292 | 1 | 99.2 | 86.9 |
| Example 3 | 7 | Particle | 24 | 4 | 285 | 0 | 292 | 0 | 99.2 | 87.0 |
| Example 4 | 7 | Particle | 26 | 0.8 | 267 | 3.2 | 269 | 4 | 99.6 | 91.1 |
| Comparative Example 1 | 7 | Particle | 30 | 0.8 | 233 | 3.2 | 233 | 4 | 99.3 | 79.7 |
| Comparative Example 2 | 7 | Particle | 30 | 2 | 233 | 2 | 233 | 1 | 99.1 | 75.0 |
| Comparative Example 3 | 7 | Particle | 30 | 4 | 233 | 0 | 233 | 0 | 99.1 | 75.2 |
| Comparative Example 4 | 7 | Fibrous | 300 | 0.8 | — | 3.2 | 23 | 4 | 99.2 | 83.4 |
| Comparative Example 5 | 7 | Scale | 3000 | 0.8 | — | 3.2 | 2.3 | 4 | 99.3 | 85.5 |

The results shown in Table 1 revealed that the discharge capacity retention rate at the 100th cycle of the respective lithium ion secondary batteries of Examples 1 to 4 was higher than that of the respective lithium ion secondary batteries of Comparative Examples 1 to 5. The reason for this is presumed to be that the ratio of the average particle diameter of the silicon-containing alloy to the average particle diameter of the carbon material is 240 or greater in Examples 1 to 4.

The respective lithium ion secondary batteries of Examples 1 and 4 have a higher discharge capacity retention rate at the 100th cycle than the lithium ion secondary battery of Comparative Example 1. The reason for this is presumed to be that the ratio of the average particle diameter of the silicon-containing alloy to the average particle diameter of the carbon material is 270 or greater in Examples 1 and 4.

The results shown in Table 1 revealed that the discharge capacity retention rate at the 100th cycle of the respective lithium ion secondary batteries of Examples 1 to 4 was higher than that of the respective lithium ion secondary batteries of Comparative Examples 1 to 3. The reason for this is presumed to be that the DBP oil absorption amount of the carbon material is 240 mL/100 g or greater in Examples 1 to 4.

The results shown in Table 1 revealed that the discharge capacity retention rate at the 100th cycle of the respective lithium ion secondary batteries of Examples 1 to 3 was higher than that of the lithium ion secondary battery of Example 4. The reason for this is presumed to be that the DBP oil absorption amount of the carbon material is 270 mL/100 g or greater in Examples 1 to 3.

The lithium ion secondary battery of Example 1 has a higher discharge capacity retention rate than the respective lithium ion secondary batteries of Examples 2 and 3. The reason for this is presumed to be that the ratio of the content of the negative electrode electric conducting additive to the content of the carbon material exceeds one, or the content of the carbon material in the negative electrode active material layer is 1% by mass or less.

The effects due to the inclusion of the solid solution lithium-containing transition metal oxide, the fibrous electric conducting additive, and the particle electric conducting additive in the positive electrode for an electric device, are further described below with reference to Reference Examples, but the present embodiment is not limited to these examples.

Reference Example 1

A lithium ion secondary battery of this example was fabricated in the same manner as Example 1, except that a silicon-containing alloy used in a negative electrode was prepared as described below. A positive electrode electric conducting additive used in Reference Example 1 includes the same fibrous electric conducting additive and particle electric conducting additive used in Example 1, which are referred to below as a fibrous electric conducting additive A and a particle electric conducting additive A for illustration purposes.

<Preparation of Negative Electrode>

First, metal powder was alloyed with a planetary ball mill (P-6, available from FRITSCH, Germany) by mechanical alloying. In particular, metal powder prepared to be Si:Sn:Ti=60:10:30 in a mass ratio was placed in a container made of zirconia together with grinding balls made of zirconia. A base stand holding the container made of zirconia was then rotated at 600 rpm for 12.5 hours to alloy the metal powder.

Subsequently, 80 parts by mass of the negative electrode active material obtained, 5 parts by mass of an electric conducting additive, and 15 parts by mass of a binder were dispersed in 100 parts by mass of N-methylpyrrolidone and mixed with a defoaming mixer (AR-100, available from THINKY CORPORATION) to prepare negative electrode slurry. The electric conducting additive was acetylene black, and the binder was polyimide.

The negative electrode slurry was applied evenly to one surface of a negative electrode current collector such that a thickness of a negative electrode active material layer after being dried resulted in 30 μm, and was then dried for 24 hours in a vacuum to obtain a negative electrode. The negative electrode current collector used was a copper foil with a thickness of 10 μm.

Reference Example 2

A lithium ion secondary battery of this example was fabricated in the same manner as Example 1, except that the added amount of the fibrous electric conducting additive A was 2.0 parts by mass, and the added amount of the particle electric conducting additive A was 1.0 parts by mass.

Reference Example 3

A lithium ion secondary battery of this example was fabricated in the same manner as Example 1, except that 1.5 parts by mass of a fibrous electric conducting additive B and 1.5 parts by mass of the particle electric conducting additive A were used for the positive electrode electric conducting additive. The fiber diameter of the fibrous electric conducting additive B was 10 nm, and the specific surface area was 180 $m^2/g$.

Reference Example 4

A lithium ion secondary battery of this example was fabricated in the same manner as Example 1, except that 3.0 parts by mass of the fibrous electric conducting additive A was only used for the positive electrode electric conducting additive.

Reference Example 5

A lithium ion secondary battery of this example was fabricated in the same manner as Example 1, except that 3.0 parts by mass of the fibrous electric conducting additive B was only used for the positive electrode electric conducting additive.

Reference Example 6

A lithium ion secondary battery of this example was fabricated in the same manner as Example 1, except that 3.0 parts by mass of the particle electric conducting additive A was only used for the positive electrode electric conducting additive.

Reference Example 7

A lithium ion secondary battery of this example was fabricated in the same manner as Example 1, except that 3.0 parts by mass of a particle electric conducting additive B was only used for the positive electrode electric conducting additive. The average primary particle diameter of the particle electric conducting additive B was 26 nm, and the specific surface area was 150 m²/g.

Reference Example 8

A lithium ion secondary battery of this example was fabricated in the same manner as Example 1, except that 3.0 parts by mass of a particle electric conducting additive C was only used for the positive electrode electric conducting additive. The average primary particle diameter of the particle electric conducting additive C was 47 nm, and the specific surface area was 108 m²/g.

Evaluation

The lithium ion secondary batteries obtained in the Reference Examples were evaluated by measuring the discharge capacity retention rate at the 50th cycle and the coulombic efficiency. Table 2 lists the measurement results.

<Discharge Capacity Retention Rate at 50th Cycle>

The discharge capacity retention rate at the 50th cycle was measured as follows: A charge-discharge cycle of charging each battery at a constant current at a rate of 0.1 C until the maximum voltage of the battery reached 4.6 V at a room temperature of 25° C. and then discharging at a constant current at a rate of 1.0 C until the minimum voltage of the battery reached 2.0 V, was repeated 50 times. The discharge capacities when the battery was discharged from 4.6 V to 2.0 V were measured at the 1st cycle and the 50th cycle, and the proportion of the discharge capacity at the 50th cycle to the discharge capacity at the 1st cycle was determined as the discharge capacity retention rate at the 50th cycle.

<Coulombic Efficiency>

The coulombic efficiency was measured as follows: A charge-discharge cycle of charging each battery at a constant current at a rate of 0.1 C until the maximum voltage of the battery reached 4.6 V at a room temperature of 25° C. and then discharging at a constant current at a rate of 1.0 C until the minimum voltage of the battery reached 2.0 V, was repeated 50 times. An average of the proportions of the discharge capacities to the charge capacities in the respective cycles was determined as the coulombic efficiency. The charge capacity in each cycle was an electric capacity when the battery was charged from 2.0 V to 4.6 V, and the discharge capacity was an electric capacity when the battery was discharged from 4.6 V to 2.0 V.

TABLE 2

| | Electric Conducting Additive in Positive Electrode for Electric Device | | | | | | | | | Estimation | |
| | Electric Conducting Additive 1 | | | | Electric Conducting Additive 2 | | | | | Discharge Capacity | |
| | Type | Fiber Diameter (nm) | Specific Surface Area (m²/g) | Content (mass %) | Type | Particle Diameter (nm) | Specific Surface Area (m²/g) | Content (mass %) | Specific Surface Area Ratio | Mass Ratio | Retention Rate at 50th Cycle (%) | Coulombic Efficiency (%) |
|---|---|---|---|---|---|---|---|---|---|---|---|---|
| Reference Example 1 | Fibrous Electric Conducting Additive A | 11 | 200 | 1.5 | Particle Electric Conducting Additive A | 25 | 206 | 1.5 | 0.971 | 1 | 80 | 99.36 |
| Reference Example 2 | Fibrous Electric Conducting Additive A | 11 | 200 | 2 | Particle Electric Conducting Additive A | 25 | 206 | 1 | 0.971 | 2 | 82 | 99.4 |
| Reference Example 3 | Fibrous Electric Conducting Additive B | 10 | 180 | 1.5 | Particle Electric Conducting Additive A | 25 | 206 | 1.5 | 0.874 | 1 | 81 | 99.4 |
| Reference Example 4 | Fibrous Electric Conducting Additive A | 11 | 200 | 3 | — | — | — | — | — | — | 75 | 99.34 |
| Reference Example 5 | Fibrous Electric Conducting Additive B | 10 | 180 | 3 | — | — | — | — | — | — | 73 | 99.29 |
| Reference Example 6 | — | — | — | — | Particle Electric Conducting Additive A | 25 | 206 | 3 | — | — | 66 | 99.31 |
| Reference Example 7 | — | — | — | — | Particle Electric Conducting Additive B | 26 | 150 | 3 | — | — | 63 | 99.21 |
| Reference Example 8 | — | — | — | — | Particle Electric Conducting Additive C | 47 | 108 | 3 | — | — | 51 | 99.14 |

The results shown in Table 2 revealed that the discharge capacity retention rate and the coulombic efficiency of the respective lithium ion secondary batteries of Reference Examples 1 to 3 including both of the fibrous electric conducting additive and the particle electric conducting additive in the positive electrode while including the silicon-containing alloy in the negative electrode, were higher than those of the respective lithium ion secondary batteries of Reference Examples 4 to 8 with either the fibrous electric conducting additive or the particle electric conducting additive not included in the positive electrode. In particular, the respective lithium ion secondary batteries of Reference Examples 1 to 3 have 80% or greater of the discharge capacity retention rate at the 50th cycle and 99.36% or greater of the coulombic efficiency. The respective lithium ion secondary batteries of Reference Examples 4 to 8 have 75% or less of the discharge capacity retention rate at the 50th cycle and 99.34% or less of the coulombic efficiency. The results thus revealed that the positive electrode including both of the fibrous electric conducting additive and the particle electric conducting additive can prevent a decrease in the cycle durability of the battery that includes the silicon-containing alloy in the negative electrode.

The comparison between Reference Example 1 and Reference Example 2 shows that the discharge capacity retention rate at the 50th cycle and the coulombic efficiency can be improved when the content of the fibrous electric conducting additive is greater than the content of the particle electric conducting additive.

While the present invention has been described above by reference to the examples, it should be understood that the present invention is not intended to be limited to these descriptions, and various modifications and improvements will be apparent to those skilled in the art.

The negative electrode for an electric device according to the present invention includes the carbon cover layer including the carbon material and covering the silicon-containing alloy, and the negative electrode electric conducting additive, in which the ratio of the average particle diameter of the silicon-containing alloy to the average particle diameter of the carbon material is set to a predetermined range. The negative electrode for an electric device according to the present invention and the electric device using the negative electrode can improve the cycle durability.

REFERENCE SIGNS LIST

1 SILICON-CONTAINING ALLOY
2 CARBON COVER LAYER
3 NEGATIVE ELECTRODE ELECTRIC CONDUCTING ADDITIVE
10 NEGATIVE ELECTRODE FOR ELECTRIC DEVICE
20 POSITIVE ELECTRODE FOR ELECTRIC DEVICE
100 ELECTRIC DEVICE

The invention claimed is:

1. A negative electrode for an electric device comprising:
a silicon-containing alloy containing silicon and tin;
a carbon cover layer including a carbon material and covering the silicon-containing alloy; and
a negative electrode electric conducting additive,
wherein a ratio of an average particle diameter of the silicon-containing alloy to an average particle diameter of the carbon material is 240 or greater,
wherein a specific surface area of the carbon material is in a range of 7.7 $m^2/g$ or greater to 206 $m^2/g$ or smaller, and
wherein a ratio of the specific surface area of the carbon material to a specific surface area of the negative electrode electric conducting additive is in a range to 10 or greater to 40 or smaller.

2. The negative electrode for an electric device according to claim 1, wherein the ratio of the average particle diameter of the silicon-containing alloy to the average particle diameter of the carbon material is 270 or greater.

3. The negative electrode for an electric device according to claim 1, wherein a DBP oil absorption amount of the carbon material is 240 mL/100 g or greater.

4. The negative electrode for an electric device according to claim 1, wherein a DBP oil absorption amount of the carbon material is 270 mL/100 g or greater.

5. The negative electrode for an electric device according to claim 1, wherein a ratio of a content of the negative electrode electric conducting additive to a content of the carbon material exceeds one.

6. The negative electrode for an electric device according to claim 1, further comprising:
a negative electrode current collector; and
a negative electrode active material layer arranged on at least one of surfaces of the negative electrode current collector and including the silicon-containing alloy, the carbon cover layer, and the negative electrode electric conducting additive,
wherein a content of the carbon material in the negative electrode active material layer is 1% by mass or less.

7. An electric device comprising:
the negative electrode for an electric device according to claim 1; and
a positive electrode for an electric device, the positive electrode including:
a positive electrode active material including a solid solution lithium-containing transition metal oxide represented by a chemical formula: $Li_{1.5}[Ni_aCo_bMn_c[Li]_d]O_3$, where Li is lithium, Ni is nickel, Co is cobalt, Mn is manganese, and O is oxygen, and a, b, c, and d satisfy relationships of $0<a<1.4$, $0 \leq b<1.4$, $0<c<1.4$, $0.1<d \leq 0.4$, $a+b+c+d=1.5$, and $1.1 \leq a+b+c<1.4$;
a fibrous electric conducting additive; and
a particle electric conducting additive.

8. The electric device according to claim 7, wherein a fiber diameter of the fibrous electric conducting additive is in a range of 5 nm or greater to 50 nm or smaller, and an aspect ratio of the fibrous electric conducting additive is 10 or greater.

9. The electric device according to claim 7, wherein an average primary particle diameter of the particle electric conducting additive is 45 nm or smaller, and a specific surface area of the particle electric conducting additive is 110 $m^2/g$ or greater.

10. The electric device according to claim 7, wherein a ratio of a mass of the fibrous electric conducting additive to a mass of the particle electric conducting additive is 0.8 or greater.

11. The electric device according to claim 7, wherein a ratio of a specific surface area of the fibrous electric conducting additive to a specific surface area of the particle electric conducting additive is in a range of 0.6 or greater to 1.3 or less.

12. The negative electrode for an electric device according to claim 1, wherein the carbon material is in a particle state or in a fibrous state.

13. The negative electrode for an electric device according to claim 1, wherein the carbon material is in a particle state, and the average particle diameter of the carbon material is in a range of 10 nm to 200 nm.

14. The negative electrode for an electric device according to claim 1, wherein the carbon material is in a fibrous state, and a length of the carbon material is in a range of 5 µm to 20 µm, and a diameter of the carbon material is in a range of 20 nm to 500 nm.

15. The negative electrode for an electric device according to claim 1, wherein the specific surface area of the carbon material is in a range of 133 $m^2/g$ or greater to 206 $m^2/g$ or smaller.

16. The negative electrode for an electric device according to claim 1, wherein a content of the negative electrode electric conducting additive in the negative electrode active material layer is 2% by mass or less.

17. The negative electrode for an electric device according to claim 1, further comprising a negative electrode binder including at least one material selected from the group consisting of polyethylene, polypropylene, polyethylene terephthalate, polymethyl acrylate, polymethyl methacrylate, polyethernitrile, polyacrylonitrile, polyamide, carboxymethylcellulose, ethylene-vinyl acetate copolymer, polyvinylidene chloride, polyvinylidene fluoride, polytetrafluoroethylene, polyvinyl fluoride, epoxy resin, and elastomer.

18. The negative electrode for an electric device according to claim 1, wherein the average particle diameter of the silicon-containing alloy is in a range of 7 µm or more to smaller than 20 µm, and
wherein the carbon material is in a particle state, and the average particle diameter of the carbon material is in a range of 24 nm or greater to 200 nm or smaller.

19. The negative electrode for an electric device according to claim 1, wherein the silicon-containing alloy is Si-Sn-Ti or Si-Sn-Ti-Al.

* * * * *